(12) United States Patent
Lee

(10) Patent No.: US 11,280,484 B2
(45) Date of Patent: Mar. 22, 2022

(54) FOLDABLE ELECTRICAL JUNCTION BOX FOR LIGHTING APPARATUS

(71) Applicant: Guangzhou Xiongzhi Lighting Industry Co., Ltd., Guangzhou (CN)

(72) Inventor: Robert Lee, Guangzhou (CN)

( * ) Notice: Subject to any disclaimer, the term of this patent is extended or adjusted under 35 U.S.C. 154(b) by 0 days.

(21) Appl. No.: 16/944,159

(22) Filed: Jul. 31, 2020

(65) Prior Publication Data

US 2021/0140615 A1 May 13, 2021

(30) Foreign Application Priority Data

Nov. 7, 2019 (CN) .......................... 201911082978.6

(51) Int. Cl.
*H02G 3/08* (2006.01)
*F21V 21/30* (2006.01)
*F21V 17/12* (2006.01)

(52) U.S. Cl.
CPC .............. *F21V 21/30* (2013.01); *F21V 17/12* (2013.01); *H02G 3/08* (2013.01)

(58) Field of Classification Search
CPC .......... H02G 3/081; H02G 3/14; H02G 3/088; H02G 3/121
See application file for complete search history.

(56) References Cited

U.S. PATENT DOCUMENTS

| | | | | | |
|---|---|---|---|---|---|
| 2,732,090 | A | * | 1/1956 | Karlin | H02G 3/081 220/3.2 |
| 4,438,859 | A | * | 3/1984 | Solek | H02G 3/081 220/3.2 |
| 2006/0076348 | A1 | * | 4/2006 | Michaud | H02G 3/081 220/3.94 |

* cited by examiner

*Primary Examiner* — Pete T Lee
(74) *Attorney, Agent, or Firm* — Prakash Nama; Global IP Services, PLLC

(57) ABSTRACT

The present invention discloses a foldable electrical junction box for lighting apparatus comprising a base board formed by a metal plate, and four side boards disposed peripherally around the base board; the four side boards are rotationally mounted on the base board which is rectangular in shape; the four side boards comprise two long side boards and two short side boards; the long side boards and the short side boards are rotationally mounted on long sides and short sides of the base board respectively; at an open state, the two long side boards and the two short side boards are rotated outwards to form a box with the base board which is open on top and has a hollow cavity; at a folded state, the two long side boards and the two short side boards are rotated inwards to fold on the base board to form a flat rectangular body.

10 Claims, 12 Drawing Sheets

FOLDABLE ELECTRICAL JUNCTION BOX FOR LIGHTING APPARATUS

BACKGROUND OF THE INVENTION

The present invention relates to electrical junction box and more specifically pertains to a foldable electrical junction box for lighting apparatus.

At present, electrical junction boxes such as IC boxes used in ceiling lights are integral boxes which are formed by welding and riveting after drawing or bending metal materials. Normally, such boxes are in cube or cuboid shape and hollow inside for receiving electrical parts and cables. However, during conventional transportation and storage processes, such integrally formed electrical junction boxes could only be packed one layer after another, so that large space is occupied for packing, thus increasing transportation costs and need for storage space. Besides, the bigger the size of the electrical junction boxes, the higher the costs for packing, transportation and storage, and such increase in costs results in huge pressure for both domestic manufacturers engaging in the export of electrical junction boxes and overseas traders engaging in the import of electrical junction boxes.

BRIEF SUMMARY OF THE INVENTION

An object of the present invention is to provide a foldable electrical junction box for lighting apparatus with rotatable and foldable side boards, so that with the principles of rotation and folding, space saving could be attained during packing and transportation, thereby reducing transportation costs and solving the problem of large occupying space brought about by the integral structure of the prior art.

To attain this, the present invention adopts the following technical proposals:

A foldable electrical junction box for lighting apparatus comprising a base board formed by a metal plate, and four side boards disposed peripherally around the base board; the four side boards are rotationally mounted on the base board; the base board is rectangular in shape; the four side boards comprise two long side boards and two short side boards; the long side boards and the short side boards are rotationally mounted on long sides and short sides of the base board respectively; at an open state, the two long side boards and the two short side boards are rotated outwards respectively to form a box with the base board which is open on top and has a hollow cavity; at a folded state, the two long side boards and the two short side boards are rotated inwards respectively to fold on the base board to form a flat rectangular body.

Furthermore, each the long side boards and the short side boards has a rotating angle of 0°-90°; when the long side boards and the short side boards are fully opened, the long side boards and the short side boards are perpendicular to the base board.

Furthermore, at the open state, the short side board and the long side board which are adjacent to each other are securely connected by a removable fastening means. In this way, during transportation, the fastening means are removed and then the long side boards and the short side boards are rotated inwards and folded into a flat rectangular body. To use, rotate and unfold into a box and fasten by the fastening means.

Furthermore, each of the short side boards is bent on two sides to form on each side a connecting board which is perpendicular to the short side board; each of the connecting boards is perforated with a first fixing hole; each of the long side boards is perforated on two sides each with a second fixing hole which corresponds with the first fixing hole; at the open state, the first fixing hole on the short side board aligns with the second fixing hole on an adjacent long side board for mounting the fastening means.

Furthermore, each of the long sides of the base board is bent upwards to form a limiting board perpendicular to the base board; each of the limiting boards has a third fixing hole; each of the long side boards has a fourth fixing hole at a bottom part thereof which corresponds with the third fixing hole.

Furthermore, the base board has an upper surface which is symmetrically disposed with four side board mounting members; each of the side board mounting members comprises a first mounting board and a second mounting board which are perpendicularly arranged in relation to the base board; each of the short side boards is rotationally connected to two of the first mounting boards positioned on same short side of the base board by a connecting means; each of the long side boards is rotationally connected to two of the second mounting boards on same long side of the base board by another of the connecting means.

Furthermore, each of the short side boards has a bottom portion which is bent on two sides to form on each side a third mounting board which is perpendicular to the short side board; each of the first mounting boards is perforated with a first mounting hole; each of the third mounting boards is perforated with a third mounting hole; each of the long side boards has a bottom portion which is bent on two sides to form on each side a fourth mounting board which is perpendicular to the long side board; each of the second mounting boards is perforated with a second mounting hole; each of the fourth mounting boards is perforated with a fourth mounting hole; another of the connecting means is disposed between each pair of the first mounting hole and the third mounting hole and between each pair of the second mounting hole and the fourth mounting hole.

Furthermore, the long side boards and the short side boards each has an upper portion which is provided with a plurality of U-shaped notches for snap-connecting with the lighting apparatus.

Furthermore, the first mounting board and the second mounting board of each of the side board mounting members are integrally formed by bending; a first end of the first mounting board connects with the second mounting board, a bottom of the second mounting board connects with the base board.

Furthermore, the connecting means is rivet or screw.

In comparison with the prior art, the present invention provides a foldable electrical junction box for lighting apparatus with the following advantages:

In the present invention, the long side boards and the short side boards which are rotationally mounted on long sides and short sides of the base board respectively may be rotated and folded to save space during packing, transportation or storage, thereby reducing transportation costs. To use, it is only necessary to rotate and unfold to restore. The entire folding and restoring processes are easy to operate.

BRIEF DESCRIPTION OF THE DRAWINGS

In order to illustrate the technical proposal of implementations of the embodiments of the present invention or existing technology clearly, the accompanying drawings which are necessary for describing the embodiments or existing technology are briefly described below. Obviously, the accompanying drawings described below are only embodiments of the present invention; the persons skilled in the art could devise other accompanying drawings in accordance with said accompanying drawings without devoting creative work.

DETAILED DESCRIPTION OF THE INVENTION

Figure 1:
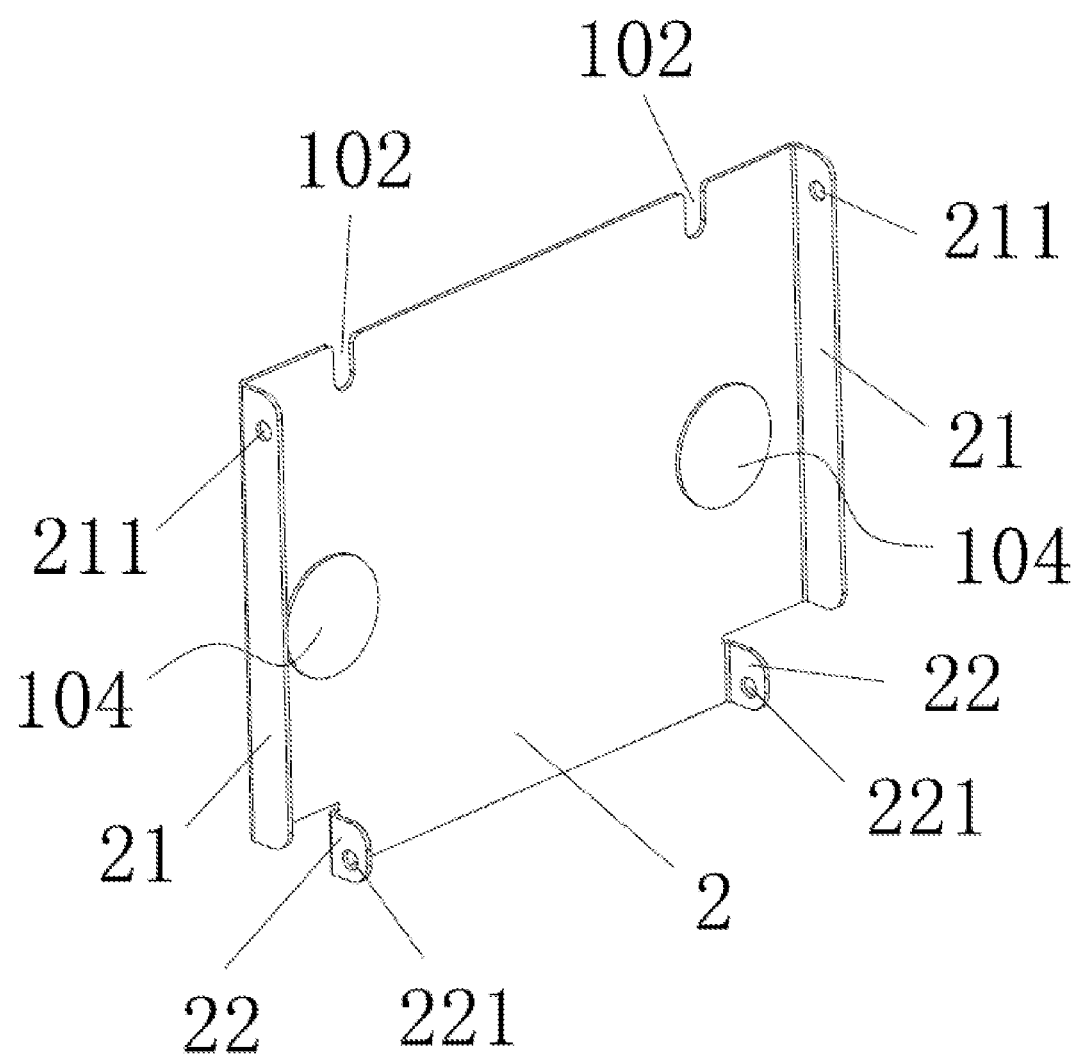
FIG. 1 is a schematic view of the structure of the short side board of the present invention.
Figure 2:
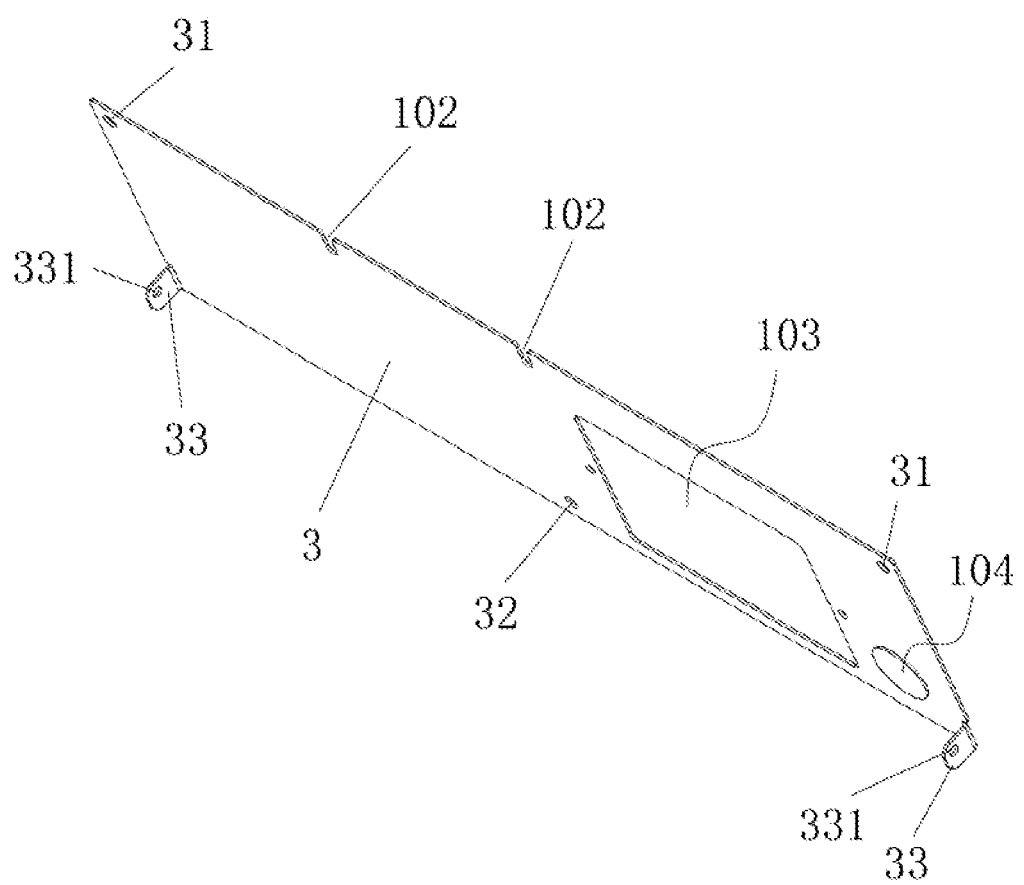
FIG. 2 is a schematic view of the structure of the long side board of the present invention.

The present invention is clearly and comprehensively explained in the following with reference to the following detailed embodiment.

With reference to FIG. 1 to FIG. 12, the present embodiment provides a foldable electrical junction box for lighting apparatus which comprises a base board 1 formed by punching and shaving a metal plate, and four side boards disposed peripherally around the base board. The four side boards are rotationally mounted on the base board 1. The base board 1 is rectangular in shape. The four side boards comprise two long side boards 3 and two short side boards 2. The long side boards 3 and the short side boards 2 are rotationally mounted on long sides and short sides of the base board 1 respectively. The long side boards 3 and the short side boards 2 each has an upper portion which is provided with a plurality of U-shaped notches 102 for snap-connecting with a lighting apparatus. At an open state, the two long side boards 3 and the two short side boards 2 are rotated outwards respectively to form a box 10 with the base board 1 which is open on top and has a hollow cavity 101. At a folded state, the two long side boards 3 and the two short side boards 2 are rotated inwards respectively to fold on the base board 1 to form a flat rectangular body.

The base board 1 has an upper surface which is symmetrically disposed with four side board mounting members 4. Each of the side board mounting members 4 comprises a first mounting board 41 and a second mounting board 42 which are perpendicularly arranged in relation to the base board 1. Each of the short side boards 42 are rotationally connected to two of the first mounting boards 41 positioned on same short side of the base board 1 by a connecting means 5; each of the long side boards 3 are rotationally connected to two of the second mounting boards 42 on same long side of the base board 1 by another of the connecting means 5. Each of the long side boards 3 and the short side boards 2 has a rotating angle of 0°-90°. When the long side boards 3 and the short side boards 2 are fully opened, the long side boards 3 and the short side boards 2 are perpendicular to the base board 1.

More specifically, each of the short side boards 2 has a bottom portion which is bent on two sides to form on each side a third mounting board 22 which is perpendicular to the short side board 2. Each of the first mounting boards 41 is perforated with a first mounting hole 411. Each of the third mounting boards 22 is perforated with a third mounting hole 221. Each of the long side boards 3 has a bottom portion which is bent on two sides to form on each side a fourth mounting board 33 which is perpendicular to the long side board 3. Each of the second mounting boards 2 is perforated with a second mounting hole 421. Each of the fourth mounting boards 33 is perforated with a fourth mounting hole 331. Another of the connecting means 5 is disposed between each pair of the first mounting hole 411 and the third mounting hole 221 and between each pair of the second mounting hole 421 and the fourth mounting hole 331. Preferably, the connecting means 5 is a rivet or a screw. The connecting means 5 serves connection and fixing functions on one hand, and serves rotation function as a rotating shaft on the other hand. To ensure no interference among the long side boards 3 and the short side boards 2 during rotation and folding, the second mounting holes 421 may be positioned at a height slightly higher than the first mounting holes 411. In other words, the height in relation to the base board 1 of the rotating shaft of each of the long side boards 3 is higher than the height in relation to the base board 1 of the rotating shaft of each of the short side boards 2, so that the long side boards 3 may be folded on top of the short side boards 2 when folding.

Each of the short side boards 2 is bent on two sides to form on each side a connecting board 21 which is perpendicular to the short side board 2. Each of the connecting boards 21 is perforated with a first fixing hole 211. Each of the long side boards 3 is perforated on two sides each with a second fixing hole 31 which corresponds with the first fixing hole 211. At the open state, the first fixing hole 211 on the short side board 2 aligns with the second fixing hole 31 on an adjacent long side board 3. To use, it is only necessary to connect the first fixing hole 211 with the second fixing hole 31 with removable fastening means such as rivet or screw, so as to connect and fix the adjacent short side boards 2 and long side boards 3 in relation to each other.

Each of the long sides of the base board 1 has a middle part which is bent upwards to form a limiting board 11 perpendicular to the base board 1. Each of the limiting boards 11 has a third fixing hole 111. Each of the long side boards 3 has a fourth fixing hole 32 at a bottom middle part thereof which corresponds with the third fixing hole 111. On one hand, the limiting boards 11 limits the opening angle of the long side boards 3 so that the long side boards 3 are eventually maintained to stay perpendicular to the base board 1. On the other hand, the bottom parts of the long side boards 3 could be securely connected to the limiting boards 11 via fasteners such as screws, thereby preventing the long side boards 3 from deforming. Preferably, the limiting boards 11 each has a height which is lower than the height of the second mounting holes 421, so as to prevent the long side boards 3 from interfering with the top parts of the limiting boards 11 when folding.

Figure 3:
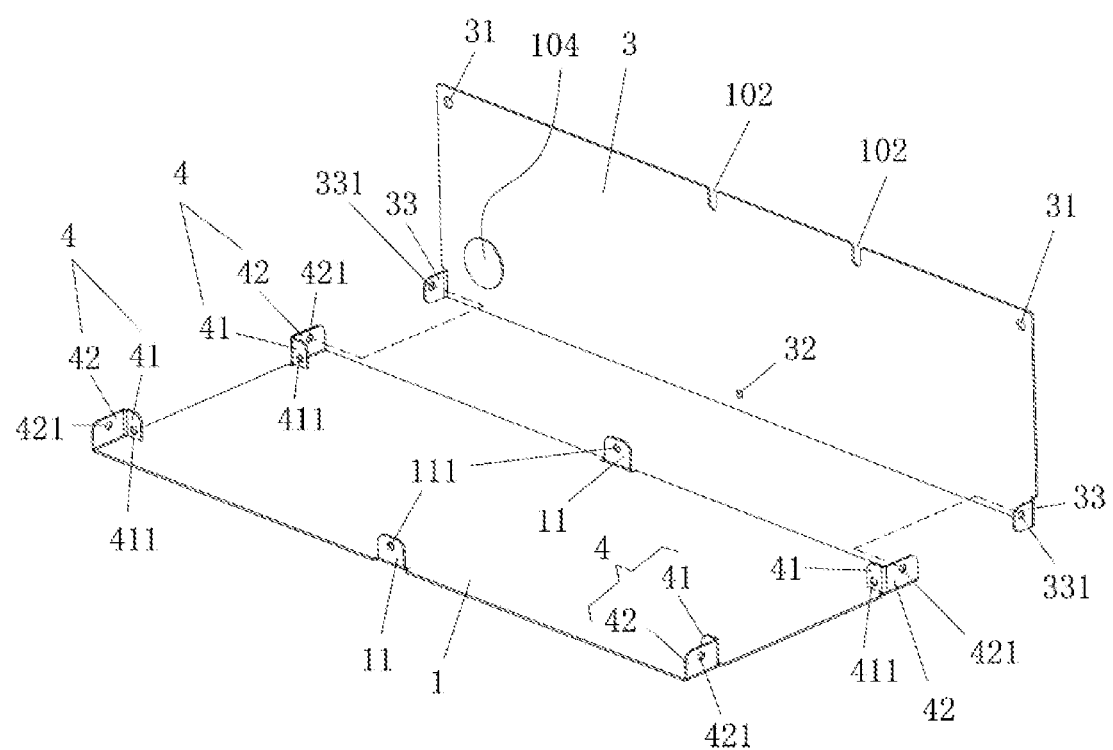
FIG. 3 is a first schematic view illustrating the mounting of the long side board to the base board.
Figure 4:
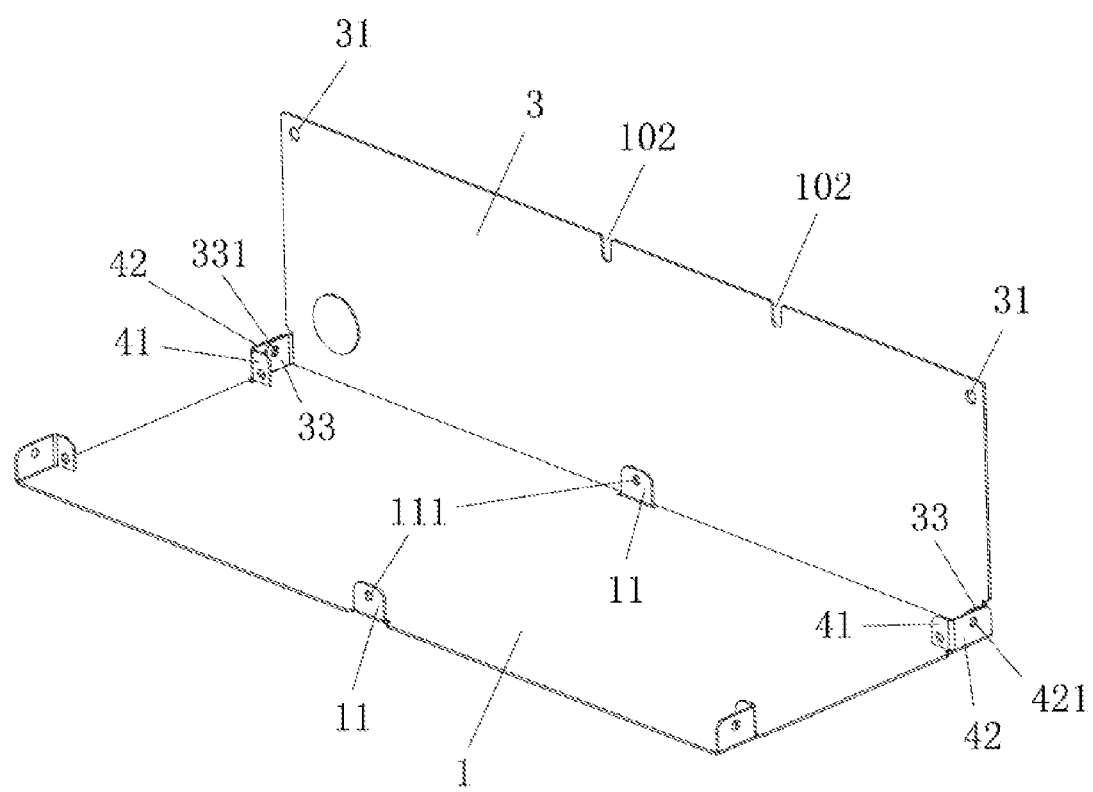
FIG. 4 is a second schematic view illustrating the mounting of the long side board to the base board.
Figure 5:
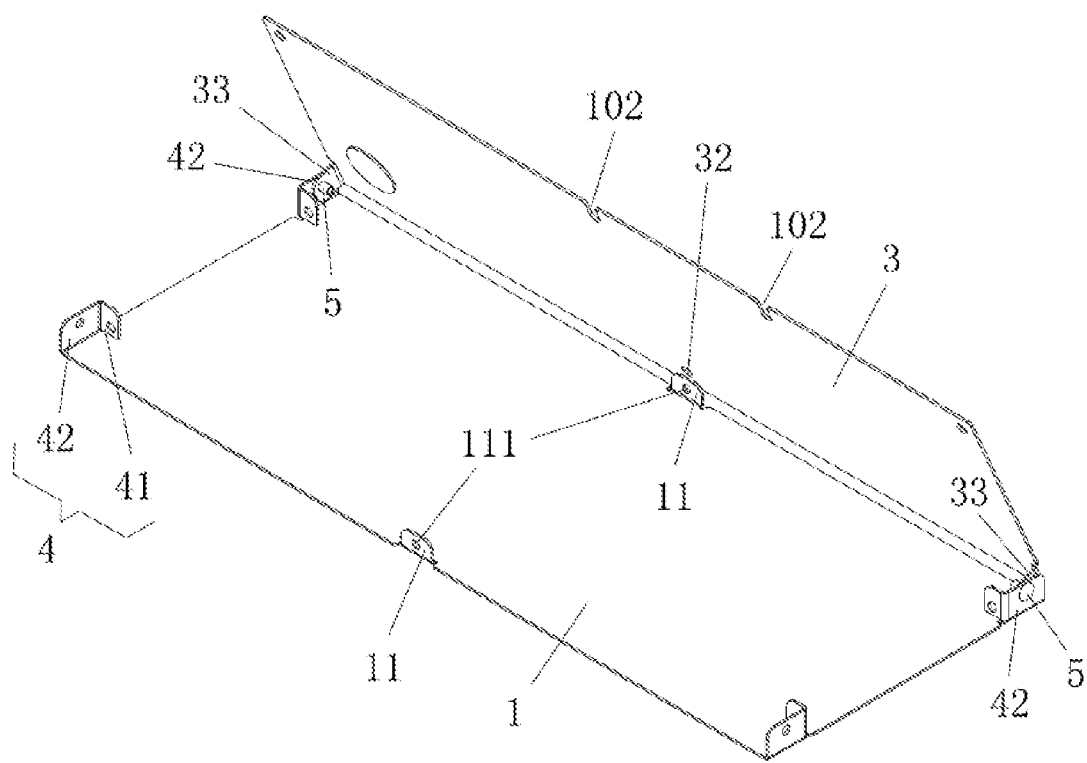
FIG. 5 is a third schematic view illustrating the mounting of the long side board to the base board.
Figure 6:
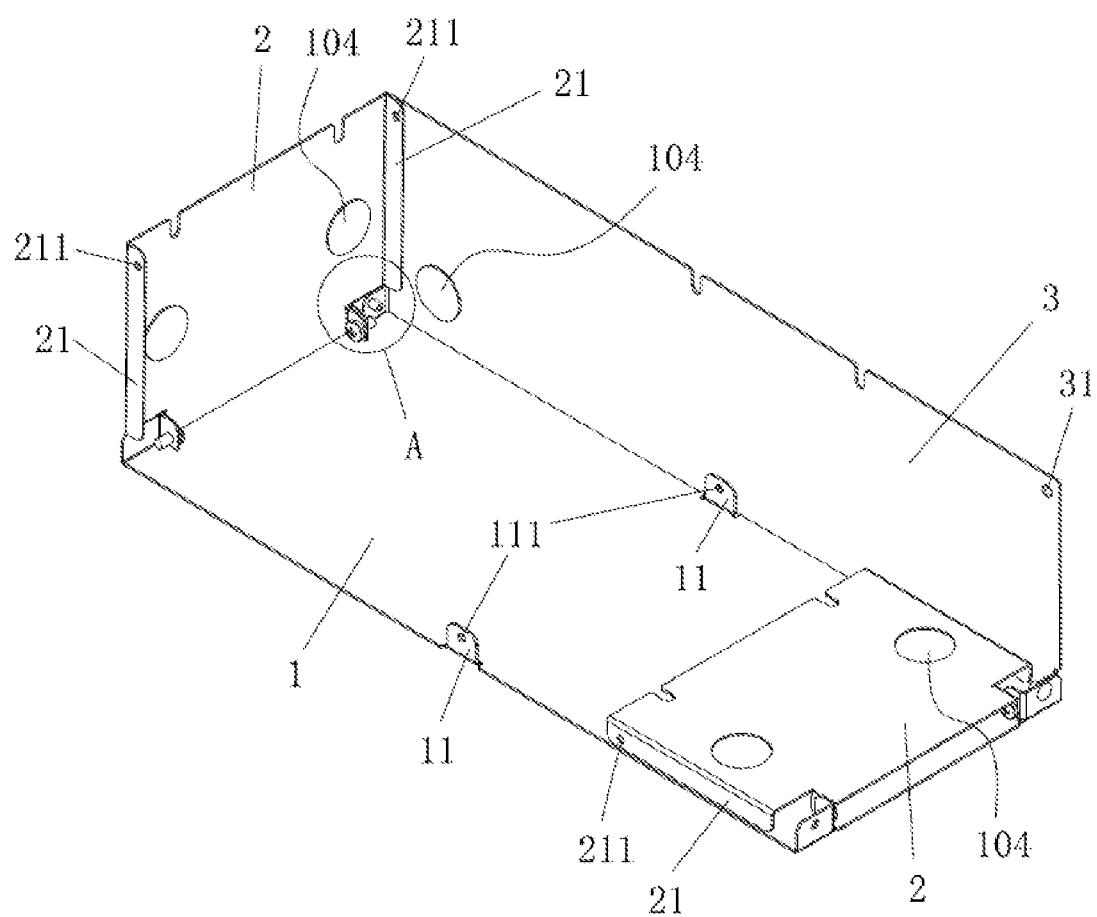
FIG. 6 is a first schematic view illustrating the mounting of the short side board to the base board.
Figure 7:
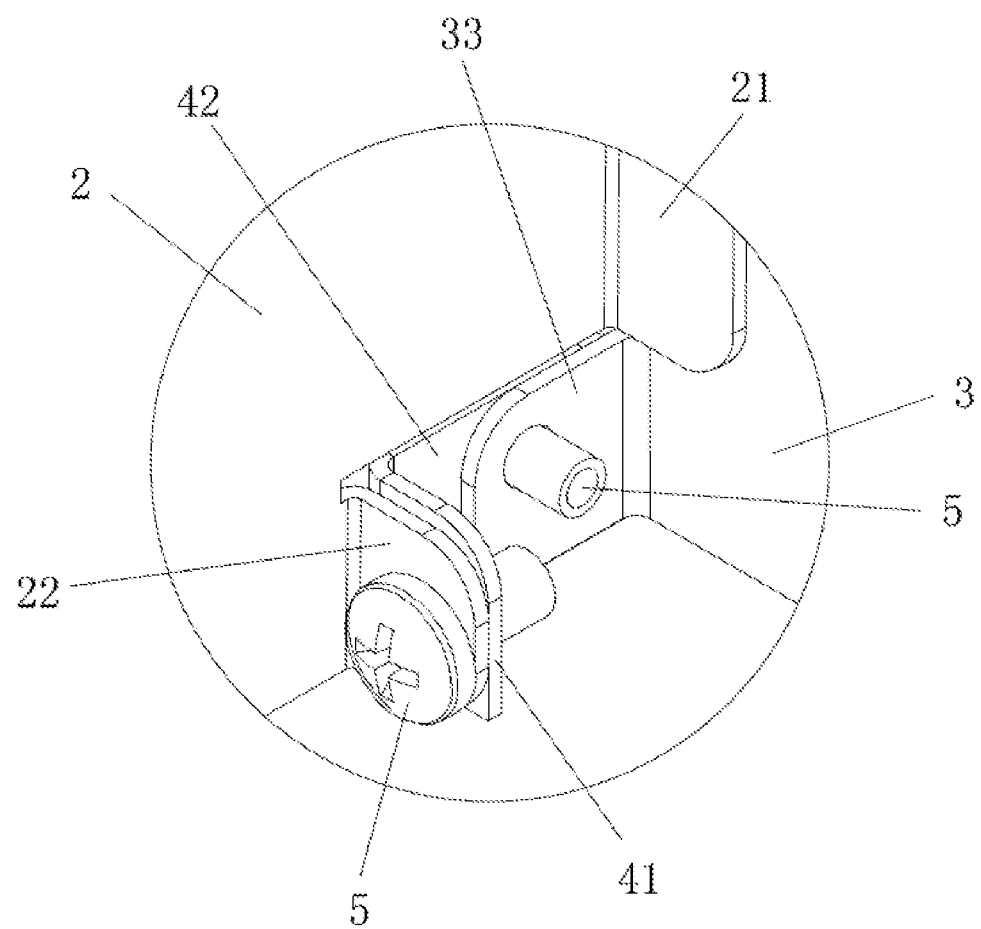
FIG. 7 is an enlarged view of the area marked A in FIG. 6.
Figure 8:
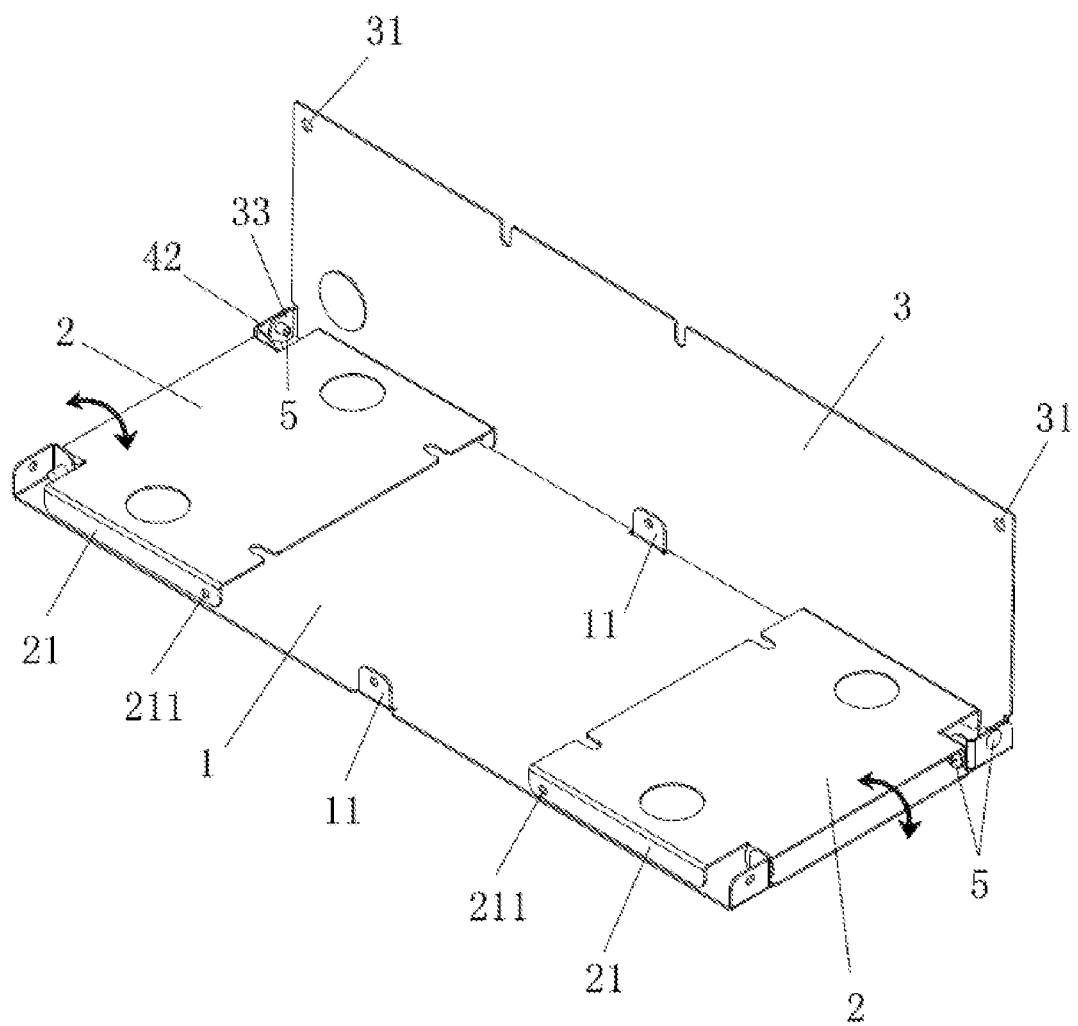
FIG. 8 is a second schematic view illustrating the mounting of the short side board to the base board.
Figure 9:
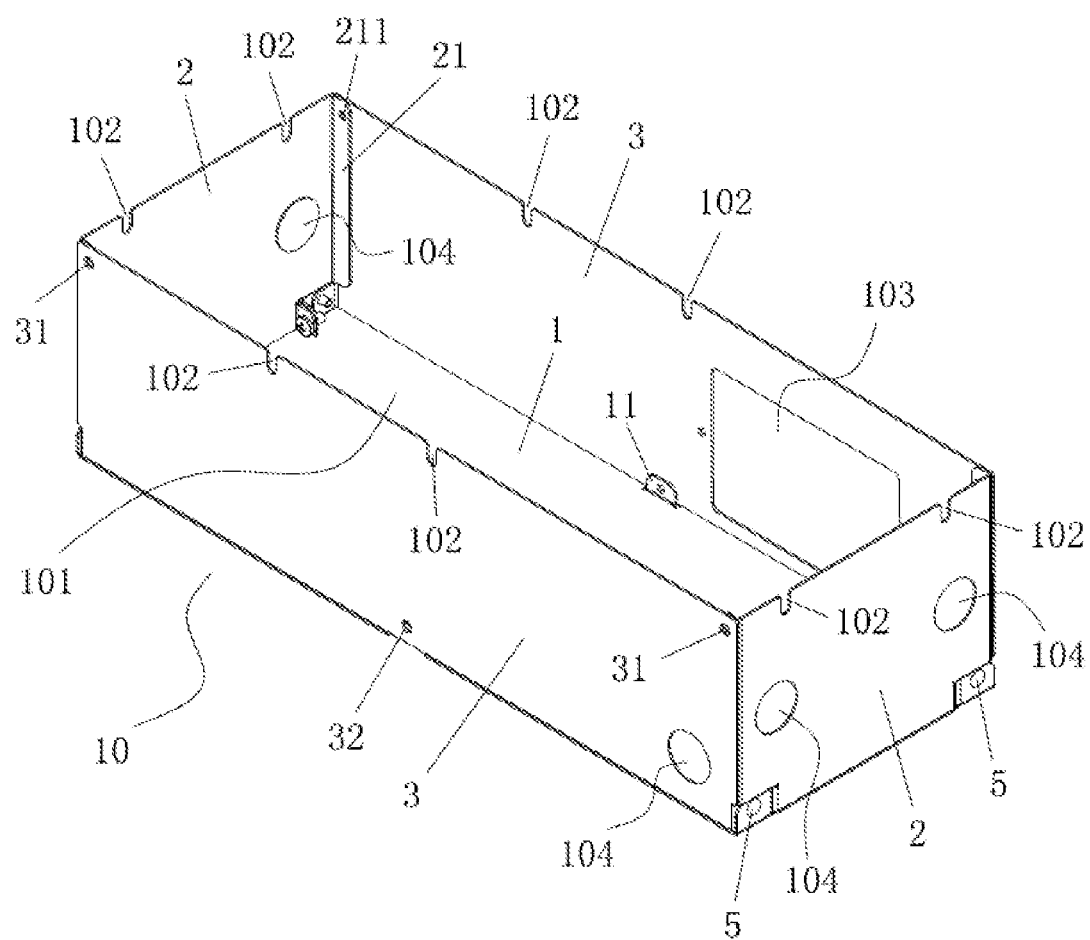
FIG. 9 is a schematic view illustrating the long side boards and the short side boards of the present invention after being fully opened.
Figure 10:
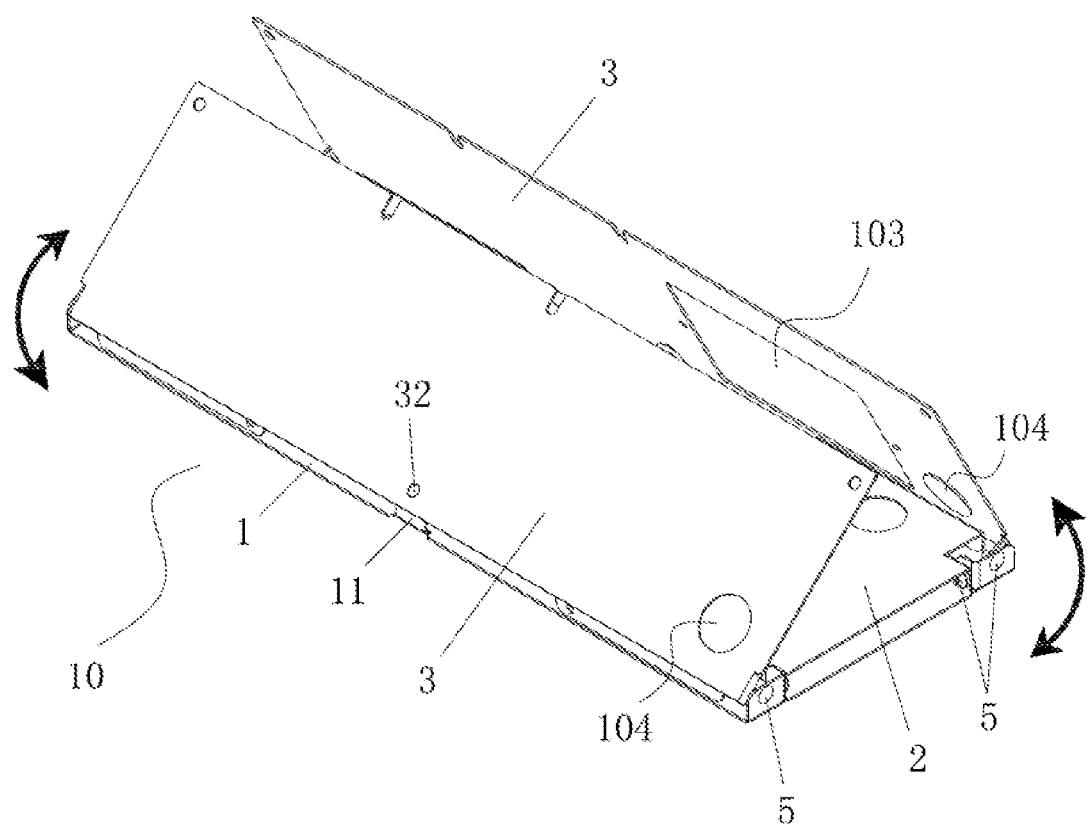
FIG. 10 is a first schematic view illustrating the rotation and folding of the long side boards and the short side boards of the present invention.
Figure 11:
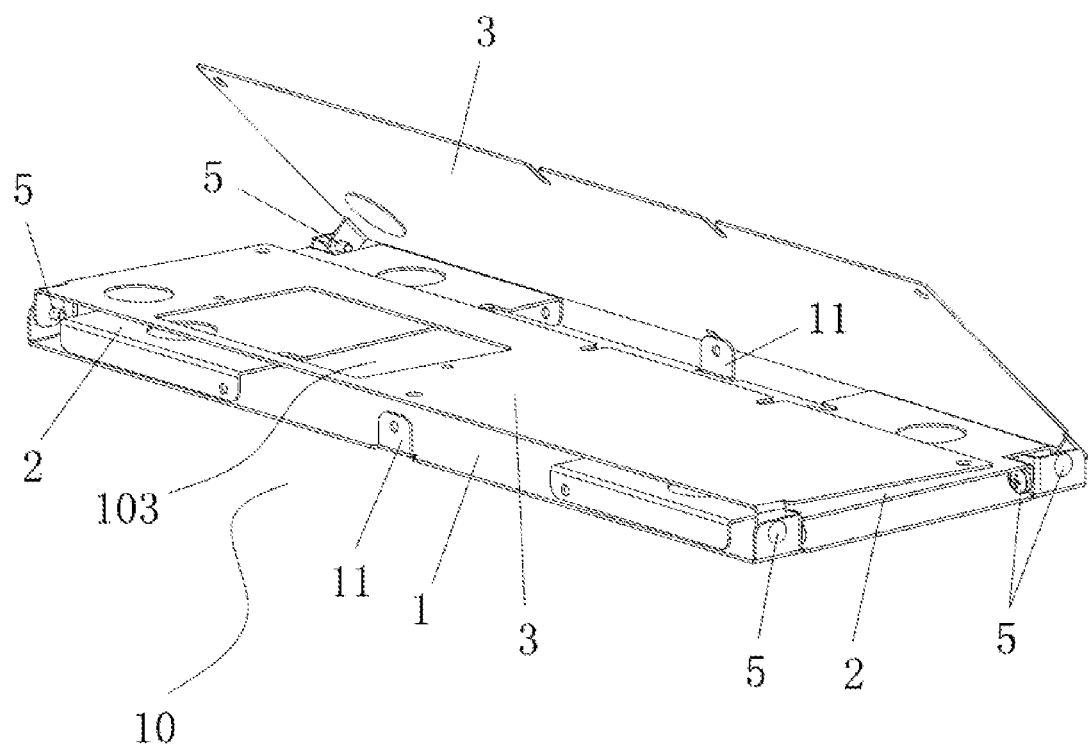
FIG. 11 is a second schematic view illustrating the rotation and folding of the long side boards and the short side boards of the present invention.
Figure 12:
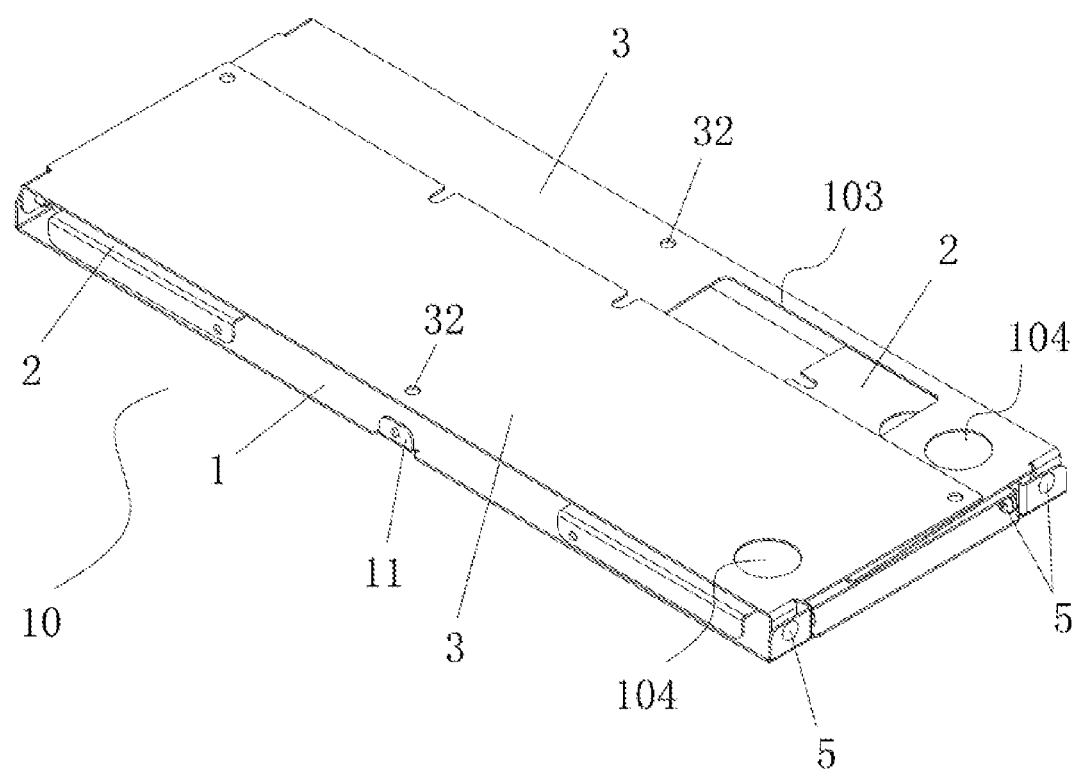
FIG. 12 is a schematic view illustrating the long side boards and the short side boards of the present invention after being fully folded.

In the present embodiment, the first mounting board 41 and the second mounting board 42 of each of the side board mounting members 4 are integrally formed by bending. A first end of the first mounting board 41 connects with the second mounting board 42, a bottom of the second mounting board 42 connects with the base board 1. As shown in FIG. 3, two of the side board mounting members 4 are arranged on a first short side of the base board 1, and another two of the side board mounting members 4 are arranged on a second short side of the base board 1, so that before bending, the first mounting board 41 and the second mounting board 42 of each of the side board mounting members 4 are positioned on two sides of the short sides of the base board 1, and the long sides of the base board 1 are relatively level, so that more base boards 1 could be formed by neat arrangement on the same metal plate, thereby saving raw material. In other embodiments, the first mounting board 41 and the second mounting board 42 on the same side board mounting member 4 could also be independently formed by bending, that is, the first mounting board 41 and the second mounting board 42 are formed by independently pressing and bending different parts of the base board 1.

In some embodiments, the long side board 3 may be provided with a rectangular mounting opening 3 to facilitate mounting of relevant electrical apparatus parts.

In some embodiments, the long side boards 3 and the short side boards 2 are each provided with a circular recess 104 on an outer surface thereof for receiving an anti-slip mat, so that the electrical junction box for lighting apparatus of the present invention could be fitted and hanged on the ceiling in a more secured manner.

In the present invention, the long side boards and the short side boards are rotationally mounted on the long sides and short sides of the base board respectively, with the principles of rotation and folding, when it is necessary to pack for transport or storage, the two short side boards are first rotated inwards and folded until they are parallel to the base board, and then the two long side boards are rotated inwards and folded until they are parallel to the base board, so that the electrical junction box for lighting apparatus which originally occupies a larger space is folded into a flat rectangular body, thus saving space and reducing transportation costs. To use, it is only necessary to rotate and unfold the long side boards and the short side boards in reverse order to restore the electrical junction box for lighting apparatus to normal 3-dimensional state. The entire folding and restoring processes are easy to operate and can be manually performed.

What is claimed is:

1. A foldable electrical junction box for lighting apparatus comprising a base board formed by a metal plate, and four side boards disposed peripherally around the base board; the four side boards are rotationally mounted on the base board; characterized in that: the base board is rectangular in shape; the four side boards comprise two long side boards and two short side boards; the long side boards and the short side boards are rotationally mounted on long sides and short sides of the base board respectively; at an open state, the two long side boards and the two short side boards are rotated outwards respectively to form a box with the base board which is open on top and has a hollow cavity; at a folded state, the two long side boards and the two short side boards are rotated inwards respectively to fold on the base board to form a flat rectangular body.

2. The foldable electrical junction box for lighting apparatus as in claim 1, characterized in that: each the long side boards and the short side boards has a rotating angle of 0°-90°.

3. The foldable electrical junction box for lighting apparatus as in claim 1, characterized in that: at the open state, the short side board and the long side board which are adjacent to each other are securely connected by a removable fastening means.

4. The foldable electrical junction box for lighting apparatus as in claim 3, characterized in that: each of the short side boards is bent on two sides to form on each side a connecting board which is perpendicular to the short side board; each of the connecting boards is perforated with a first fixing hole; each of the long side boards is perforated on two sides each with a second fixing hole which corresponds with the first fixing hole; at the open state, the first fixing hole on the short side board aligns with the second fixing hole on an adjacent long side board for mounting the fastening means.

5. The foldable electrical junction box for lighting apparatus as in claim 4, characterized in that: each of the long sides of the base board is bent upwards to form a limiting board perpendicular to the base board; each of the limiting boards has a third fixing hole; each of the long side boards has a fourth fixing hole at a bottom part thereof which corresponds with the third fixing hole.

6. The foldable electrical junction box for lighting apparatus as in claim 5, characterized in that: the base board has an upper surface which is symmetrically disposed with four side board mounting members; each of the side board mounting members comprises a first mounting board and a second mounting board which are perpendicularly arranged in relation to the base board; each of the short side boards is rotationally connected to two of the first mounting boards positioned on same short side of the base board by a connecting means; each of the long side boards is rotationally connected to two of the second mounting boards on same long side of the base board by another of the connecting means.

7. The foldable electrical junction box for lighting apparatus as in claim 6, characterized in that: each of the short side boards has a bottom portion which is bent on two sides to form on each side a third mounting board which is perpendicular to the short side board; each of the first mounting boards is perforated with a first mounting hole; each of the third mounting boards is perforated with a third mounting hole; each of the long side boards has a bottom portion which is bent on two sides to form on each side a fourth mounting board which is perpendicular to the long side board; each of the second mounting boards is perforated with a second mounting hole; each of the fourth mounting boards is perforated with a fourth mounting hole; another of the connecting means is disposed between each pair of the first mounting hole and the third mounting hole and between each pair of the second mounting hole and the fourth mounting hole.

8. The foldable electrical junction box for lighting apparatus as in claim 7, characterized in that: the long side boards and the short side boards each has an upper portion which is provided with a plurality of U-shaped notches for snap-connecting with the lighting apparatus.

9. The foldable electrical junction box for lighting apparatus as in claim 7, characterized in that: the first mounting board and the second mounting board of each of the side board mounting members are integrally formed by bending; a first end of the first mounting board connects with the second mounting board, a bottom of the second mounting board connects with the base board.

10. The foldable electrical junction box for lighting apparatus as in claim 6, characterized in that: the connecting means is rivet or screw.

\* \* \* \* \*